(12) United States Patent
Sato et al.

(10) Patent No.: US 6,841,968 B2
(45) Date of Patent: Jan. 11, 2005

(54) MOTOR DRIVER CIRCUIT AND METHOD OF CONTROLLING THE MOTOR DRIVER CIRCUIT

(75) Inventors: Eiji Sato, Toyota (JP); Hideo Nakai, Aichi-gun (JP); Hiroki Ohtani, Aichi-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 105 days.

(21) Appl. No.: 10/052,738

(22) Filed: Jan. 23, 2002

(65) Prior Publication Data

US 2002/0145401 A1 Oct. 10, 2002

(30) Foreign Application Priority Data

Feb. 2, 2001 (JP) ........................................ 2001-026377

(51) Int. Cl.[7] .............................. H02P 1/24; H02P 1/42; H02P 3/18; H02P 5/28; H02P 7/36
(52) U.S. Cl. ...................... 318/727; 318/798; 318/801; 318/805
(58) Field of Search .................... 318/700, 720–724, 318/727, 798, 801, 805, 811–814

(56) References Cited

U.S. PATENT DOCUMENTS

| | | | |
|---|---|---|---|
| 5,038,092 A | * | 8/1991 | Asano et al. |
| 5,463,301 A | * | 10/1995 | Kim |
| 5,585,708 A | * | 12/1996 | Richardson et al. |
| 5,739,650 A | * | 4/1998 | Kimura et al. ............... 318/254 |
| 5,969,500 A | * | 10/1999 | Ishikawa et al. |
| 6,344,725 B2 | * | 2/2002 | Kaitani et al. |
| 6,377,017 B2 | * | 4/2002 | Kondou et al. |
| 6,396,229 B1 | * | 5/2002 | Sakamoto et al. |
| 6,531,843 B2 | * | 3/2003 | Iwaji et al. |
| 6,700,400 B2 | * | 3/2004 | Atarashi ..................... 324/772 |

FOREIGN PATENT DOCUMENTS

| | | |
|---|---|---|
| JP | 8-289599 | 1/1996 |
| JP | A-08-336300 | 12/1996 |

* cited by examiner

*Primary Examiner*—Marlon T. Fletcher
(74) *Attorney, Agent, or Firm*—Kenyon & Kenyon

(57) ABSTRACT

A motor driver circuit including an inverter, a motor-drive-current detector, a current detector, and a controller operable to calculate a d-axis current difference between the detected d-axis current and a commanded d-axis current value, and a q-axis current difference between the detected q-axis current and a commanded q-axis current value. The controller is further operable on the basis of the calculated d-axis and q-axis current differences, to calculate a d-axis difference signal which is not influenced by a q-axis input voltage of the motor and which is influenced by a d-axis input voltage of the motor, and a q-axis difference signal which is not influenced by the d-axis input voltage and which is influenced by the q-axis input voltage. The controller controls the inverter, so as to zero the d-axis and q-axis difference signals.

9 Claims, 5 Drawing Sheets

MOTOR DRIVER CIRCUIT AND METHOD OF CONTROLLING THE MOTOR DRIVER CIRCUIT

INCORPORATION BY REFERENCE

The disclosure of Japanese Patent Application No. 2001-026377 filed on Feb. 2, 2001 including the specification, drawings and abstract, is incorporated herein by reference in its entirety.

BACKGROUND OF THE INVENTION

1. Field of the Invention

The present invention relates to a driver circuit for an electric motor, which is capable of performing a non-interference processing operation in which a d-axis control and a q-axis control are effected independently of each other, and further relates to a method of controlling the motor driver circuit.

2. Discussion of Related Art

There is known a vector control as a method of control an electric motor. In the vector control, a motor drive current is controlled such that a d-axis current and a q-axis current which are respectively an exciting current component and a torque current component of the motor drive current are controlled independently of each other.

There is also known a feedback control for controlling the rotation of an electric motor, wherein an output current of the motor is detected, and the motor is controlled in a feedback fashion on the basis of the detected output current. This feedback control uses a non-interference processor operable to perform a non-interference processing operation on the output current and an input voltage of the motor.

Described in detail referring to FIG. 4, there is shown a prior art control circuit for an electric motor 20. In this control circuit, an output current of the electric motor 20 is detected by a current detector 22. The motor 20 is a three-phase permanent-magnet motor, which is operated with a three-phase alternating current being applied to three-phase coils of its stator. The current detector 22 is arranged to detect the electric current of the coil of each phase, and convert the detected current into currents in a d-q coordinate system defined by a d-axis of a rotor of the motor and a q-axis which is perpendicular to the d-axis. The rotor is rotated about the d-axis in synchronization of a magnetic flux produced by a permanent magnet thereof, in a direction of the magnetic flux. The d-axis current (exciting current component) is represented by "id", and the q-axis current (torque current component) is represented by "iq".

The detected d-axis current values id and iq are applied to a calculator 10, to which are applied a commanded d-axis current value and a commanded q-axis current value. The calculator 10 is arranged to obtain differences or errors between the detected d-axis and q-axis current values and the corresponding commanded values.

On the basis of the obtained differences, a current controller 12 generates voltage control values for the d-axis and the q-axis. The voltage control values are provided to eliminate or zero the difference between the commanded and detected d-axis current values, and the difference between the commanded and detected q-axis current values.

At the same time, the detected d-axis current id and the q-axis current iq are also applied to a non-interference processor 14, which is arranged to perform a predetermined arithmetic operation to generate voltages $\overline{vd}$ and $\overline{vq}$ corresponding to the voltages of the d-axis and the q-axis. These voltage values $\overline{vd}$, $\overline{vq}$ are applied to a calculator 16, which is arranged to add the voltage values $\overline{vd}$, $\overline{vq}$ to commanded voltage values ud, uq representative of the differences obtained by the calculator 12. The commanded voltage values have been subjected to a non-interference processing with respect to the d-axis and q-axis. The non-interference processor 14 is represented by an equation (4) described below.

Commanded values of the d-axis and q-axis obtained by the calculator 16 are converted by a three-phase converter 24 into commanded alternating voltage values for the three phases U, V and W, and these commanded alternating voltage values are applied to an inverter 18. The inverter 18 performs a PWM (pulse width modulation) control on the basis of the commanded alternating voltage values and a carrier wave (a chopping wave), to control a switching transistor, for controlling a terminal voltage of each phase of the motor 20.

The motor 20 is represented by the following equation (3), while the non-interference processor 14 is represented by the following equation (4):

$$\frac{d}{dt}\begin{pmatrix}id\\iq\end{pmatrix} = \begin{pmatrix}-R/Ld & \omega Lq/Ld\\-\omega Lq/Lq & -R/Lq\end{pmatrix}\begin{pmatrix}id\\iq\end{pmatrix} + \begin{pmatrix}1/Ld & 0\\0 & 1/Lq\end{pmatrix}\begin{pmatrix}vd\\vq\end{pmatrix} - \begin{pmatrix}0\\\omega\Phi/Lq\end{pmatrix} \quad (3)$$

wherein, id: d-axis current,
iq: q-axis current,
vd: d-axis voltage (actually applied to the motor),
vq: q-axis voltage (actually applied to the motor),
Ld: d-axis inductance,
Lq: q-axis inductance,
R: electric resistance of the motor,
ω: angular velocity of the rotor of the motor, and
Φ: number of magnetic cross fluxes of the magnet of the motor.

$$\begin{pmatrix}\overline{vd}\\\overline{vq}\end{pmatrix} = \begin{pmatrix}ud\\uq\end{pmatrix} - \begin{pmatrix}0 & \omega Lq\\-\omega Ld & 0\end{pmatrix}\begin{pmatrix}id\\iq\end{pmatrix} + \begin{pmatrix}0\\\omega\Phi\end{pmatrix} \quad (4)$$

When the values uu, uv, uw for the three phases U, V, W obtained by conversion of the commanded voltage values $\overline{vd}$, $\overline{vq}$ are equal to or smaller than the voltage value applied to the inverter, the commanded voltage values $\overline{vd}$, $\overline{vq}$ and the voltage values vd, vq actually applied to the motor are generally considered to be equal to each other. Accordingly, a system which consists of the non-interference processor, motor, inverter, etc. and which receives commanded voltage values ud, uq as its input can be represented by the following equation (5):

$$\frac{d}{dt}\begin{pmatrix}id\\iq\end{pmatrix} = \begin{pmatrix}-R/Ld & 0\\0 & -R/Lq\end{pmatrix}\begin{pmatrix}id\\iq\end{pmatrix} + \begin{pmatrix}1/Ld & 0\\0 & 1/Lq\end{pmatrix}\begin{pmatrix}ud\\uq\end{pmatrix} \quad (5)$$

Thus, the values ud and uq to be obtained by the non-interference processor 14 depend on the respective values id and iq, but do not depend on the values of the current associated with the other axis, i.e., ud does not depend on iq, and uq does not depend on id. Thus, the motor drive control can be effected such that the d-axis control and the q-axis control are effected independently of each other.

In the control of the motor, a term corresponding to a speed electromotive force is used as an interference term, and the non-interference processor 14 is arranged to perform a processing operation for eliminating that speed electromotive force.

Thus, the use of the non-interference processor 14 makes it possible to perform the non-interference processing operation on the voltage commands. In particular, the method using the non-interference processor 14 permits handling of a control object as a system having a single input and a single output, in the absence of a non-interference term, and therefore permits easy designing of the control system. The use of the non-interference processor 14 has another advantage that a resonance in the motor which is caused by the interference term and which occurs at a frequency near the operating frequency of the motor can be removed by the non-interference processing operation, resulting in an improvement in the control performance at a frequency other than the resonance frequency.

However, the non-interference processor 14 described above has a prerequisite that the values uu, uv and uw for the three phases U, V and W obtained by conversion of the commanded voltage values $\overline{vd}$, $\overline{vq}$ be equal to or smaller than the voltage value applied to the inverter.

In the actual control of the motor, the voltage applied to the inverter is limited or restricted by an electric power source from which the voltage is applied to the inverter. Where the motor is used on an electric vehicle, in particular, a battery is used as the electric power source, and the voltage applied to the inverter is determined by the voltage of the battery. Therefore, when the values uu, uv, uw for the three phases U, V, W obtained by conversion of the commanded voltage values $\overline{vd}$, $\overline{vq}$ are increased to a value equal to or higher than the line voltage (Vmax) of the battery, as a result of increase of the values uu, uv, uw, the voltage values vd, vq actually applied to the motor cannot be made equal to the commanded voltage values $\overline{vd}$, $\overline{vq}$, at each instantaneous point of time during the control of the motor, so that some suitable non-linear compensation of the actual voltage values vd, vq is required. For instance, the actual voltage values vd, vq are subjected to non-linear compensation according to the following equations:

$$vd = fd(\overline{vd}, V\max)$$

$$vq = fq(\overline{vq}, V\max)$$

In this case, the above-indicated prerequisite is not satisfied, that is, the commanded voltage values $\overline{vd}$, $\overline{vq}$ and the voltage values vd, vq actually applied to the motor cannot be considered to be equal to each other. Therefore, the system which consists of the non-interference processor, motor, inverter, etc. and which receives the commanded voltage values ud, uq as its input cannot be represented by the above equation (5), where the non-interference processor is arranged for preventing the interference as described above. FIGS. 5a and 5b show examples of changes of the d-axis current id and q-axis current iq when the above-indicated prerequisite for the non-interference processor 14 is not satisfied. It will be understood from FIGS. 5a and 5b, too, that the motor currents id and iq suffer from oscillation in the presence of the interference term.

SUMMARY OF THE INVENTION

The present invention was made in view of the drawback discussed above. It is therefore an object of the present invention to provide a motor driver circuit and a method of controlling the motor drive circuit, which circuit and method make it possible to substantially prevent an interference between the output current and the input voltage of an electric motor even when the voltage value Vmax becomes lower than the commanded voltage values uu, uv, uw.

According to one aspect of the present invention, there is provided a driver circuit for driving a permanent-magnet electric motor, the driver circuit comprising: an inverter for generating an electric current to be applied to the permanent-magnet motor, according to a commanded voltage value applied thereto; a motor-drive-current detector operable to for detect a drive current of the motor; a current detector operable on the basis of the detected drive current, to detect a d-axis current and a q-axis current which are respectively an exciting current component and a torque current component of the detected drive current; and a controller operable to calculate a d-axis current difference between the detected d-axis current and a commanded d-axis current value, and a q-axis current difference between the detected q-axis current and a commanded q-axis current value, the controller being further operable on the basis of the calculated d-axis and q-axis current differences, to calculate a d-axis difference signal which is not influenced by a q-axis input voltage of the motor and which is influenced by a d-axis input voltage of the motor, and a q-axis difference signal which is not influenced by the d-axis input voltage and which is influenced by the q-axis input voltage, the controller controlling the inverter on the basis of the calculated d-axis and q-axis difference signals, such that the d-axis and q-axis difference signals are zeroed.

According to another aspect of this invention, there is provided a method of controlling a driver circuit for driving an electric motor, the method comprising the steps of: detecting a drive current of the motor; detecting, on the basis of the detected drive current, a d-axis current and a q-axis current which are respectively an exciting current component and a torque current component of the detected drive current; calculating a d-axis current difference between the detected d-axis current and a commanded d-axis current value, and a q-axis current difference between the detected q-axis current and a commanded q-axis current value; calculating, on the basis of the calculated d-axis and q-axis current differences, a d-axis difference signal which is not influenced by a q-axis input voltage of the motor and which is influenced by a d-axis input voltage of the motor, and a q-axis difference signal which is not influenced by the d-axis input voltage and which is influenced by the q-axis input voltage; and controlling an inverter on the basis of the calculated d-axis and q-axis difference signals, such that the d-axis and q-axis difference signals are zeroed.

The motor driver circuit and the method of controlling the motor driver circuit, which have been described above, are arranged to calculate the d-axis difference signal which is not influenced by the q-axis input voltage of the motor and which is influenced by the d-axis input voltage, and the q-axis difference signal which is not influenced by the d-axis input voltage and which is influenced by the q-axis input voltage. Accordingly, the input voltage actually applied to the motor and the output of non-interference processing means of the controller will not interfere with each other. This arrangement does not require a conventional prerequisite that the values uu, uv and uw for the three phases U, V and W obtained by conversion of the commanded voltage values $\overline{vd}$, $\overline{vq}$ be equal to or smaller than the voltage value applied to the inverter. Accordingly, the interference can be prevented even where the above-indicated prerequisite is not satisfied.

BRIEF DESCRIPTION OF THE DRAWINGS

The above and other objects, features, advantages, and technical and industrial significance of this invention will be better understood by reading the following detailed description of presently preferred embodiments of the invention, when considered in connection with the accompanying drawings, in which.

DETAILED DESCRIPTION OF THE PREFERRED EMBODIMENTS

Referring to the accompanying drawings, there will be described presently preferred embodiments of this invention.

Figure 1:
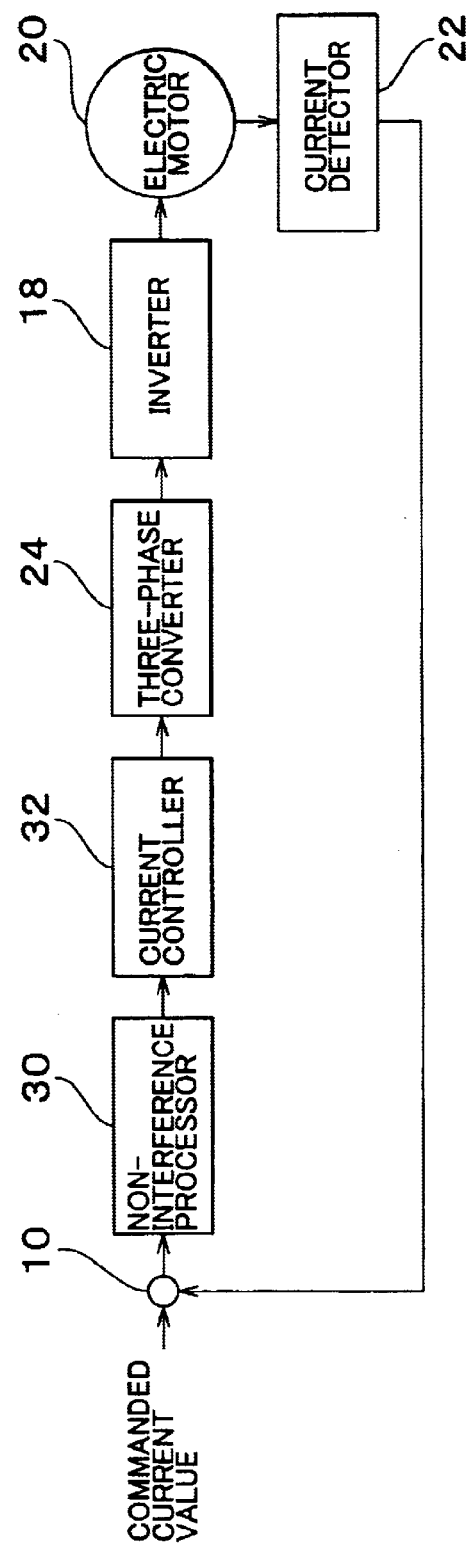
FIG. 1 is a block diagram showing an arrangement of preferred embodiments of this invention.

The block diagram of FIG. 1 shows an arrangement of a motor driver circuit of the preferred embodiments of the invention, wherein a d-axis current id and a q-axis current of each phase of a permanent-magnet electric motor 20 are detected by a current detector 22, and the detected d-axis current id and q-axis current iq are applied to a calculator 10. The calculator 10 receives commanded current values idr and iqr, which are generated by an external microcomputer, for instance. The calculator 10 is arranged to calculate a difference (idr−id) between the commanded current value idr and the detected d-axis current value id, and a difference (iqr−iq) between the commanded current value iqr and the detected q-axis current value iq. The calculated differences are applied to a non-interference processor 30, which is arranged to calculate a differential output xd and a differential output xq on the basis of the differences. The differential output xd corresponds to the d-axis current value which has been subjected to a non-interference processing, while the differential output xq corresponds to the q-axis current value which has been subjected to the non-interference processing.

The differential outputs xd, xq calculated by the non-interference processor 30 are applied to a current controller 32, which is arranged to perform an arithmetic operation for calculating commanded voltage values $\overline{vd}$ and $\overline{vq}$ which cause the differential outputs xd, xq to be zeroed. The calculated commanded voltage values vd, vq are converted by a three-phase converter 24 into values for the three phases, which are applied to an inverter 18. As a result, the inverter 18 is controlled such that the differential outputs xd, xq are zeroed. That is, the ON and OFF states of the switching transistor of the inverter 18 are controlled so that suitably controlled electric currents are sequentially applied to the coils of the three phases of the three-phase motor 20. The terminal voltage of the motor is controlled by PWM control of the duty ratio of the switching transistor of the inverter 18 in response to the control signal received from the current controller 32 and the non-linear function described above.

The drive current is applied from the inverter 18 to the motor 20, in the manner described above, and the operation of the motor 20 is controlled on the basis of the commanded current values idr, iqr. In particular, the present embodiment is characterized in that the current differences (idr−id) and (iqr−iq) are subjected to the non-interference processing by the non-interference processor 30, to obtain the differential outputs xd, xq, which are independent of each other (do not interfere with each other) and can be controlled independently of each other.

First Embodiment

There will be described the substance of the non-interference processor 30. This non-interference processor 30 performs the processing operation represented by the following equations:

$$\begin{pmatrix} xd \\ xq \end{pmatrix} = \begin{pmatrix} R - \omega dLd & -\omega Lq \\ \omega Ld & R - \omega dLq \end{pmatrix}\begin{pmatrix} jd \\ jq \end{pmatrix} + \begin{pmatrix} \omega dLd & 0 \\ 0 & \omega dLq \end{pmatrix}\begin{pmatrix} idr - id \\ iqr - iq \end{pmatrix} \quad (6)$$

$$\frac{d}{dt}\begin{pmatrix} jd \\ jq \end{pmatrix} = \begin{pmatrix} -\omega d & 0 \\ 0 & -\omega d \end{pmatrix}\begin{pmatrix} jd \\ jq \end{pmatrix} + \begin{pmatrix} \omega d & 0 \\ 0 & \omega d \end{pmatrix}\begin{pmatrix} idr - id \\ iqr - iq \end{pmatrix} \quad (7)$$

wherein, id: d-axis current,
  iq: q-axis current,
  idr: commanded d-axis current value,
  iqr: commanded q-axis current value,
  vd: d-axis voltage (actually applied to the motor),
  vq: q-axis voltage (actually applied to the motor),
  Ld: d-axis inductance,
  Lq: q-axis inductance,
  R: electric resistance of the motor 20,
  ω: angular velocity of the rotor of the motor 20,
  Φ: number of magnetic cross fluxes of the magnet of the motor 20,
  xd: d-axis differential output of the processor 30,
  xq: q-axis differential output of the processor 30,
  jd: d-axis state quantity of the processor 30,
  jq: q-axis state quantity of the processor 30, and
  ωd: coefficient.

According to the above equations (6) and (7), the current differences (idr−id) and (iqr−iq) are converted into the differential outputs xd and xq.

By applying these differential outputs xd and xq to the above equation (3) of the motor 20, it will be understood that the differential outputs xd, xq have been subjected to the non-interference processing so that they do not interfere with each other. This aspect will be further discussed.

Initially, the above equation (3) is converted into the following equation (8), by the Laplace transformation:

$$X = \frac{1}{\left(\frac{R^2}{LdLq} + \omega^2\right) + \left(\frac{R}{Ld} + \frac{R}{Lq}\right)s + s^2}\begin{pmatrix} \frac{R}{Lq} + s & \frac{Lq}{Ld}\omega \\ -\frac{Ld}{Lq}\omega & s + \frac{R}{Ld} \end{pmatrix}V \quad (8)$$

wherein $$X = \pounds\begin{pmatrix} id \\ iq \end{pmatrix}$$

$$V = \pounds\begin{pmatrix} vd \\ vq \end{pmatrix}$$

£0: Laplace transformation

Incidentally, the third term of the right part of the equation (3) is eliminated in the above described equation (8).

On the other hand, the equation (4) of the non-interference processor 30 is converted into the following equation (9), by the Laplace transformation:

$$\overline{X} = \begin{pmatrix} R - \omega dLd & -\omega Lq \\ \omega Ld & R - \omega dLq \end{pmatrix}\frac{-\omega d}{s + \omega d}X - \begin{pmatrix} \omega dLd & 0 \\ 0 & \omega dLq \end{pmatrix}X \quad (9)$$

wherein $$\overline{X} = \pounds\begin{pmatrix} Xd \\ Xq \end{pmatrix}$$

In the above equation (9), the commanded current values idr, iqr are zeroed, since these values do not relate to the non-interference processing by the processor 30.

The following equation (10) can be derived from the above equations (8) and (9):

$$\overline{X} = \left\{ \begin{pmatrix} R - \omega dLd & -\omega Lq \\ \omega Ld & R - \omega dLq \end{pmatrix} \frac{-\omega d}{s + \omega d} - \begin{pmatrix} \omega dLd & 0 \\ 0 & \omega dLq \end{pmatrix} \right\} \quad (10)$$

$$\frac{1}{D(s)} \begin{pmatrix} \frac{R}{Lq} + s & \frac{Lq}{Ld}\omega \\ -\frac{Ld}{Lq}\omega & s + \frac{R}{Ld} \end{pmatrix} t$$

wherein $$D(s) = \left(\frac{R^2}{LdLq} + \omega^2\right) + \left(\frac{R}{Ld} + \frac{R}{Lq}\right)s + s^2$$

The above equation (10) can be simplified into the following equation (11):

$$\overline{X} = \left\{ \begin{pmatrix} -\omega dR + \omega d^2 Ld & \omega^2 dLq \\ -\omega^2 dLd & -\omega dR + \omega d^2 Lq \end{pmatrix} - \right. \quad (11)$$

$$\left. \begin{pmatrix} \omega dLds + \omega d^2 Ld & 0 \\ 0 & \omega dLqs + \omega d^2 Lq \end{pmatrix} \right\} \times \frac{1}{s + \omega d} \times \frac{1}{D(s)} \times \begin{pmatrix} \frac{R}{Lq} + s & \frac{Lq}{Ld}\omega \\ -\frac{Ld}{Lq}\omega & s + \frac{R}{Ld} \end{pmatrix} V$$

$$= \begin{pmatrix} -(R + Lds)\left(\frac{R}{Lq} + s\right) - \omega Lq\frac{Lq}{Ld}\omega & -(R + Lds)\frac{Lq}{Ld}\omega + \omega Lq\left(s + \frac{R}{Ld}\right) \\ -\omega Ld\left(\frac{R}{Lq} + s\right) + (R + Lqs)\left(\frac{Lq}{Ld}\omega\right) & -\omega Ld\frac{Lq}{Ld}\omega - (R + Lqs)\left(s + \frac{R}{Ld}\right) \end{pmatrix} \times \frac{1}{D(s)} \times \frac{\omega d}{s + \omega d} V$$

$$= \begin{pmatrix} -LdD(s) & 0 \\ 0 & -LqD(s) \end{pmatrix} \times \frac{1}{D(s)} \times \frac{\omega d}{s + \omega d} V$$

$$= \begin{pmatrix} -Ld\frac{1}{\frac{s}{\omega d} + 1} & 0 \\ 0 & -Lq\frac{1}{\frac{s}{\omega d} + 1} \end{pmatrix} \times V$$

It will be understood that the values $\overline{X}$ and V do not interfere with each other. Namely, the values xd and xq depend on the values vd and vq, respectively, but do not depend on the values associated with their respective other axes, i.e., xd does not depend on vq, and xq does not depend on vd.

Figure 2A:
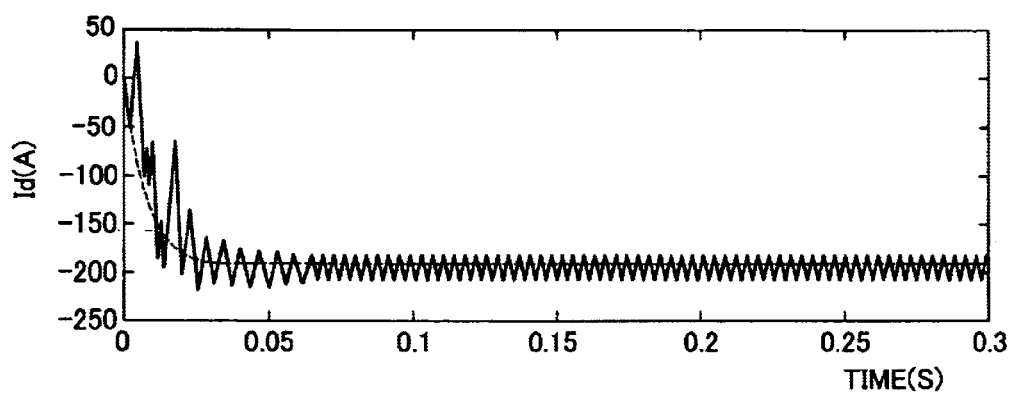
FIG. 2a is a view showing a change of a d-axis current id with the time in the first embodiment.
Figure 2B:
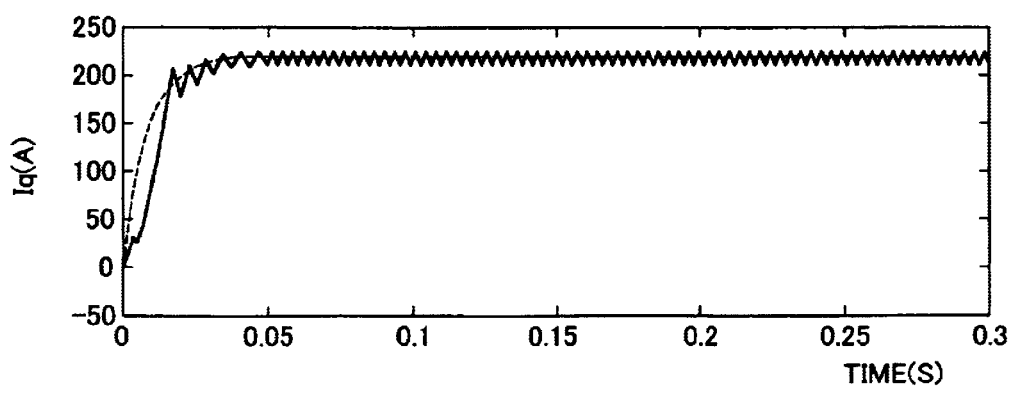
FIG. 2*b* is a view showing a change of a q-axis current iq with the time in the first embodiment.

FIGS. 2a and 2b show examples of a control of the motor 20 in a saturated-voltage region (in which the commanded voltage value is equal to or larger than the maximum value) in the present first embodiment. It will be understood that the motor current values id and iq are controlled exactly following the commanded values, owing to the non-interference processing operation performed by the non-interference processor 30. In FIGS. 2a and 2b, broken lines indicate the commanded current values, while solid lines indicate the actual current values of the motor 20.

Second Embodiment

The non-interference processor 30 may have an arrangement represented by the following equation (12):

$$\begin{pmatrix} xd \\ xq \end{pmatrix} = \begin{pmatrix} R & \omega Lq \\ -\omega Ld & R \end{pmatrix} \begin{pmatrix} idr - id \\ iqr - iq \end{pmatrix} \quad (12)$$

It will be understood that an interference term remains in the equation (12) according to the second embodiment. However, xd=R(idr−id)+ωLq(iqr−iq), and xq=−ωLd(idr−id)+R(iqr−iq). Thus, the current difference of the same axis is multiplied by the electric resistance R, while the current difference of the other axis is multiplied by the angular velocity and the inductance. Accordingly, an influence of the current difference of the other axis is comparatively small at a relatively low frequency.

The interference between the d-axis and q-axis current differences is substantially eliminated, in view of general physical specifications of the motor 20 and the rotating speed of its rotor.

Figure 3A:
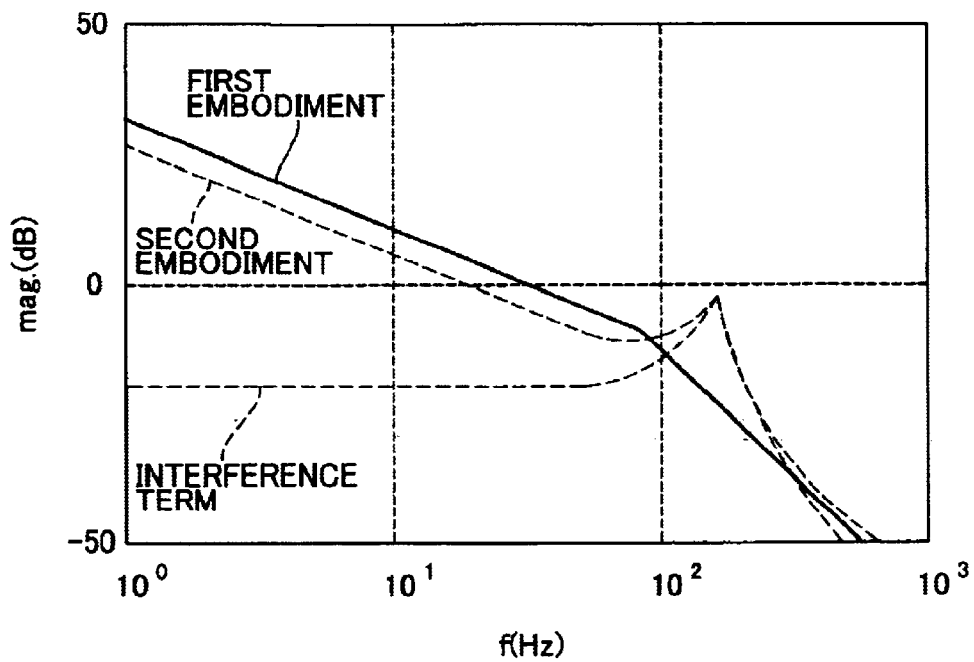
FIG. 3*a* is a view showing transfer functions from vd to xd and from vq to xd, in a non-interference processing operation in the first and second embodiments of this invention.
Figure 3B:
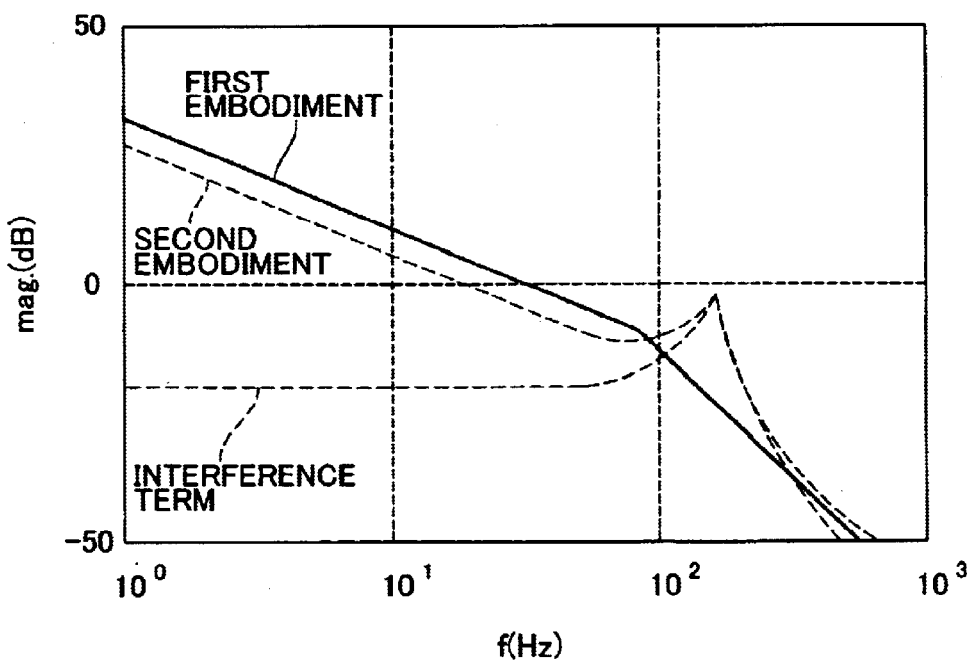
FIG. 3*b* is a view showing transfer functions from vd to xq and from vq to xq, in the non-interference processing operation.
Figure 4:
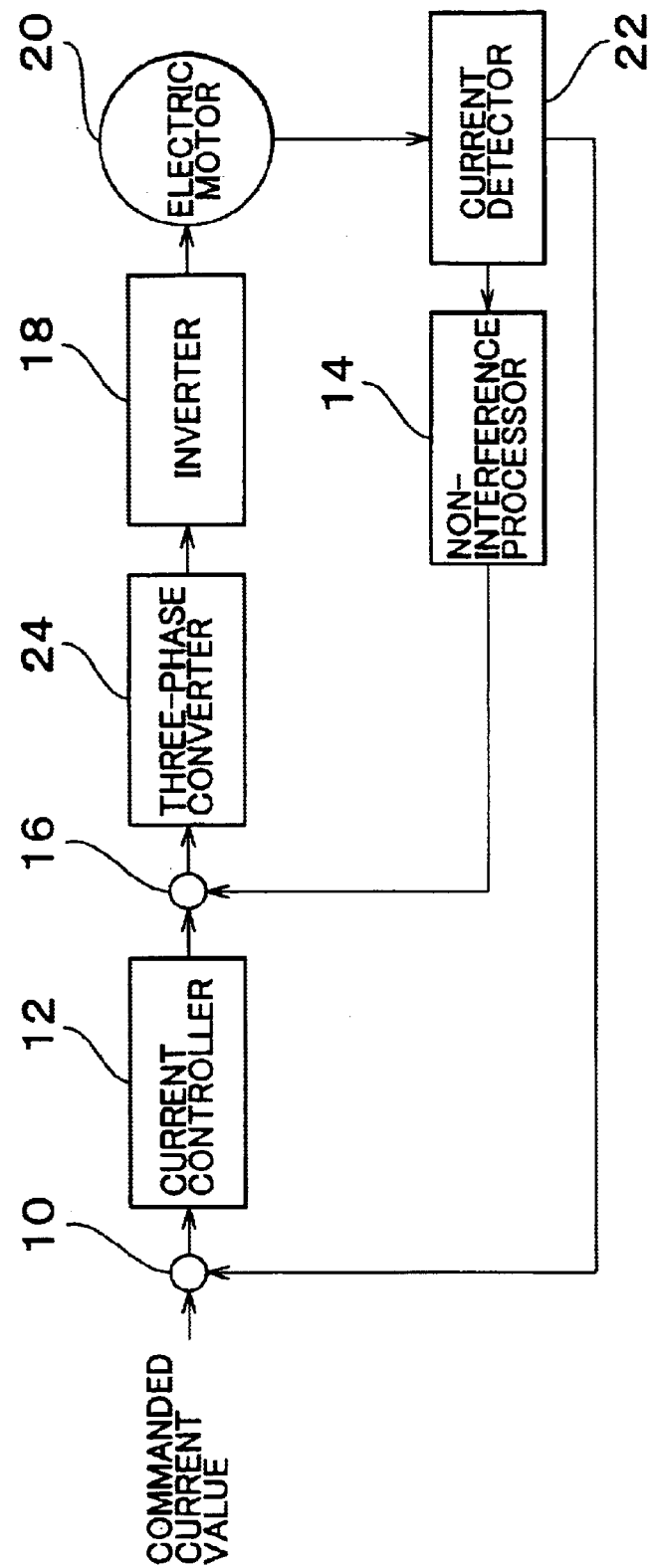
FIG. 4 is a block diagram showing a prior art arrangement.
Figure 5A:
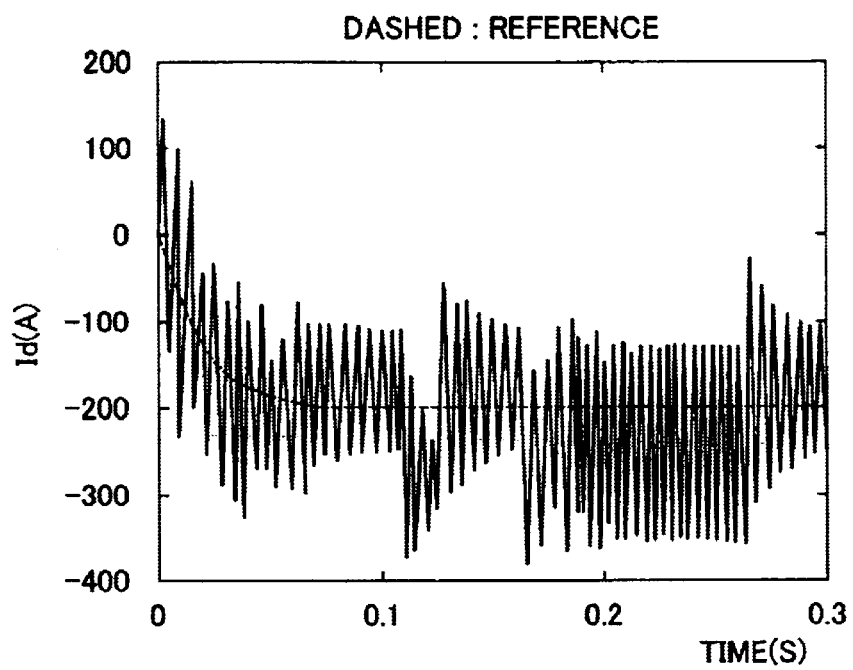
FIG. 5*a* is a view showing a change of a d-axis current id with the time in the prior art.
Figure 5B:
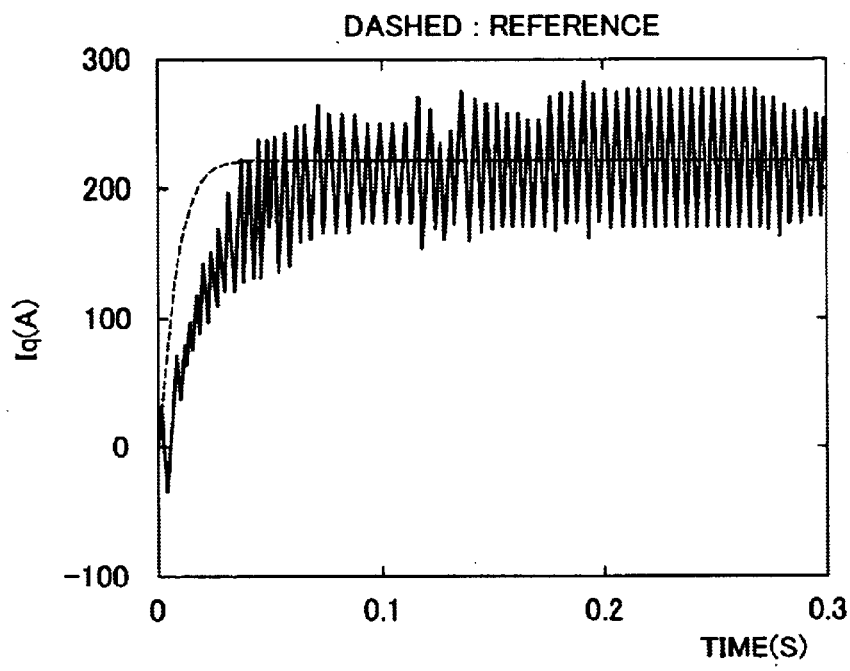
FIG. 5*b* is a view showing a change of a q-axis current iq with the time in the prior art.

FIGS. 3a and 3b show dependency on the frequency when the motor 20 is controlled by the driver circuits according to the first and second embodiments. In FIGS. 3a and 3b, solid lines indicate the first embodiment, while broken lines indicate the second embodiment. In the graph of FIG. 3a, magnitudes (unit: dB) of transfer functions from the d-axis voltage vd to the d-axis differential output xd and the q-axis voltage vq to the d-axis differential output xd are taken along the ordinate. In the graph of FIG. 3b, magnitudes (unit: dB) of transfer functions from the d-axis voltage vd to the q-axis differential output xq and the q-axis voltage vq to the q-axis differential output xq are taken along the ordinate. It will be understood from FIGS. 3a and 3b that the motor 20 can be adequately controlled at a frequency not lower than 100 Hz, in both of the first and second embodiments.

Broken lines in FIGS. 3a and 3b also indicate dependency of the interference term on the frequency. It will be understood that there exists an influence of the interference term at the frequency not lower than 100 Hz, in the second embodiment.

As described above, the non-interference processor 30 in the illustrated embodiments is arranged to calculate a d-axis difference signal (error signal) xd which is not influenced by the q-axis input voltage of the motor 20 and which is influenced by the d-axis input voltage, and a q-axis difference signal (error signal) xq which is not influenced by the d-axis input voltage and which is influenced by the q-axis input voltage. Accordingly, the input voltage actually applied to the motor 20 and the output of the non-interference processor 30 will not interference with each other, even where the motor is operated with the maximum input voltage.

Further, the non-interference processor 30 calculates the d-axis and q-axis difference signals (error signals) xd, xq described just above, also in a relatively low frequency range, so that the interference between the input voltage and the output of the processor 30 can be substantially prevented in the relatively low frequency range by comparatively easy calculation.

While the preferred embodiments of the present invention have been described, for illustrative purpose only, it is to be understood that the invention is not limited to the details of the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A driver circuit for driving a permanent-magnet electric motor, comprising:

an inverter for generating an electric current to be applied to the permanent-magnet motor, according to a commanded voltage value applied thereto;

a motor-drive-current detector operable to detect the drive current of the motor;

a current detector operable to detect a d-axis current and a q-axis current which are respectively an exciting current component and a torque current component of the detected drive current; and a controller operable to calculate a d-axis current difference between the detected d-axis current and a commanded d-axis current value, and a q-axis current difference between the detected q-axis current and a commanded q-axis current value, said controller being further operable to calculate a d-axis difference signal which is a function of a d-axis input voltage of the motor and is not a function of a q-axis input voltage of the motor, and a q-axis difference signal which is a function of the q-axis input voltage and is not a function of the d-axis input voltage, said controller controlling said inverter on the basis of the calculated d-axis and q-axis difference signals, such that the d-axis and q-axis difference signals are zeroed, wherein said controller generates a value xd as said d-axis difference signal, and a value xq as said q-axis difference signal, based on factors including an inductance of the motor and an electric resistance of the motor, wherein said factors further include an angular velocity of the motor, wherein the values xd and xq being represented by the following equation:

$$\begin{pmatrix} xd \\ xq \end{pmatrix} = \begin{pmatrix} R - \omega dLd & -\omega Lq \\ \omega Ld & R - \omega dLq \end{pmatrix} \begin{pmatrix} jd \\ jq \end{pmatrix} + \begin{pmatrix} \omega dLd & 0 \\ 0 & \omega dLq \end{pmatrix} \begin{pmatrix} idr - id \\ iqr - iq \end{pmatrix}$$

$$\frac{d}{dt} \begin{pmatrix} jd \\ jq \end{pmatrix} = \begin{pmatrix} -\omega d & 0 \\ 0 & -\omega d \end{pmatrix} \begin{pmatrix} jd \\ jq \end{pmatrix} + \begin{pmatrix} \omega d & 0 \\ 0 & \omega d \end{pmatrix} \begin{pmatrix} idr - id \\ iqr - iq \end{pmatrix}$$

wherein id is said d-axis current, iq is said q-axis current, idr is said commanded d-axis current value, iqr is said commanded q-axis current value, vd is a d-axis voltage applied to the motor, vq is a q-axis voltage applied to the motor, Ld is an inductance of the d-axis of the motor, Lq is an inductance of the q-axis of the motor, R is an electric resistance of the motor, ω is an angular velocity of a rotor of the motor, Φ is a number of magnetic cross fluxes of a permanent magnet of the motor, jd is a d-axis state quantity of said controller, jq is a q-axis state quantity of said controller, and ωd is a coefficient.

2. A driver circuit for driving a permanent-magnet electric motor, comprising:

an inverter for generating an electric current to be applied to the permanent-magnet motor, according to a commanded voltage value applied thereto;

a motor-drive-current detector operable to detect the drive current of the motor;

a current detector operable to detect a d-axis current and a q-axis current which are respectively an exciting current component and a torque current component of the detected drive current; and a controller operable to calculate a d-axis current difference between the detected d-axis current and a commanded d-axis current value, and a q-axis current difference between the detected q-axis current and a commanded q-axis current value, said controller being further operable to calculate a d-axis difference signal which is a function of a d-axis input voltage of the motor and is not a function of a q-axis input voltage of the motor, and a q-axis difference signal which is a function of the q-axis input voltage and is not a function of the d-axis input voltage, said controller controlling said inverter on the basis of the calculated d-axis and q-axis difference signals, such that the d-axis and q-axis difference signals are zeroed, wherein said controller is operable for calculating said d-axis difference signal and said q-axis difference signal in a low frequency range, said controller controlling said inverter on the basis of the calculated d-axis and q-axis difference signals, such that the d-axis and q-axis difference signals are zeroed, and said controller generates a value xd as said d-axis difference signal, and a value xq as said q-axis difference signal, the values xd and xq being represented by the following equation:

$$\begin{pmatrix} xd \\ xq \end{pmatrix} = \begin{pmatrix} R & \omega Lq \\ -\omega Ld & R \end{pmatrix} \begin{pmatrix} idr - id \\ iqr - iq \end{pmatrix}$$

wherein id is said d-axis current, iq is said q-axis current, idr is said commanded d-axis current value, iqr is said commanded q-axis current value, Ld is an inductance of the d-axis of the motor, Lq is an inductance of the q-axis of the motor, R is an electric resistance of the motor, and ω is an angular velocity of a rotor of the motor.

3. A driver circuit for driving a permanent-magnet electric motor, by comprising:

an inverter for generating an electric current to be applied to the motor, according to a commanded voltage value applied thereto;

a motor-drive-current detector operable to detect a drive current of the motor;

a current detector operable to detect a d-axis current and a q-axis current which are respectively an exciting current component and a torque current component of the detected drive current;

a current-difference calculator operable to calculate a d-axis current difference between the detected d-axis current and a commanded d-axis current value, and a q-axis current difference between the detected q-axis current and a commanded q-axis current value;

a non-interference processor operable to calculate a d-axis difference signal which is a function of a d-axis input voltage of the motor and is not a function of a q-axis input voltage of the motor, and a q-axis difference signal which is a function of the q-axis input voltage and is not a function of the d-axis input voltage; and an inverter controller operable to control said inverter on the basis of the calculated d-axis and q-axis difference signals, such that the d-axis and q-axis difference signals are zeroed, wherein that said non-interference processor generates a value xd as said d-axis difference signal, and a value xq as said q-axis difference signal, the values xd and xq being represented by the following equation:

$$\begin{pmatrix} xd \\ xq \end{pmatrix} = \begin{pmatrix} R - \omega dLd & -\omega Lq \\ \omega Ld & R - \omega dLq \end{pmatrix}\begin{pmatrix} jd \\ jq \end{pmatrix} + \begin{pmatrix} \omega dLd & 0 \\ 0 & \omega dLq \end{pmatrix}\begin{pmatrix} idr - id \\ iqr - iq \end{pmatrix}$$

$$\frac{d}{dt}\begin{pmatrix} jd \\ jq \end{pmatrix} = \begin{pmatrix} -\omega d & 0 \\ 0 & -\omega d \end{pmatrix}\begin{pmatrix} jd \\ jq \end{pmatrix} + \begin{pmatrix} \omega d & 0 \\ 0 & \omega d \end{pmatrix}\begin{pmatrix} idr - id \\ iqr - iq \end{pmatrix}$$

wherein id is said d-axis current, iq is said q-axis current, idr is said commanded d-axis current value, iqr is said commanded q-axis current value, vd is a d-axis voltage applied to the motor, vq is a q-axis voltage applied to the motor, Ld is an inductance of the d-axis of the motor, Lq is an inductance of the q-axis of the motor, R is an electric resistance of the motor, ω is an angular velocity of a rotor of the motor, Φ is a number of magnetic cross fluxes of the permanent magnet, jd is a d-axis state quantity of said non-interference processor, jq is a q-axis state quantity of said non-interference processor, and ωd is a coefficient.

4. A driver circuit according to claim 3, wherein that said non-interference processor is operable on the basis of the calculated d-axis and q-axis current differences, for calculating said d-axis difference signal and said q-axis difference signal in a low frequency range.

5. A driver circuit for driving a permanent-magnet electric motor, by comprising:

an inverter for generating an electric current to be applied to the motor, according to a commanded voltage value applied thereto;

a motor-drive-current detector operable to detect a drive current of the motor;

a current detector operable to detect a d-axis current and a q-axis current which are respectively an exciting current component and a torque current component of the detected drive current;

a current-difference calculator operable to calculate a d-axis current difference between the detected d-axis current and a commanded d-axis current value, and a q-axis current difference between the detected q-axis current and a commanded q-axis current value;

a non-interference processor operable to calculate a d-axis difference signal which is a function of a d-axis input voltage of the motor and is not a function of a q-axis input voltage of the motor, and a q-axis difference signal which is a function of the q-axis input voltage and is not a function of the d-axis input voltage; and an inverter controller operable to control said inverter on the basis of the calculated d-axis and q-axis difference signals, such that the d-axis and q-axis difference signals are zeroed, wherein that said non-interference processor generates a value xd as said d-axis difference signal, and a value xq as said q-axis difference signal, the values xd and xq being represented by the following equation:

$$\begin{pmatrix} xd \\ xq \end{pmatrix} = \begin{pmatrix} R & \omega Lq \\ -\omega Ld & R \end{pmatrix}\begin{pmatrix} idr - id \\ iqr - iq \end{pmatrix}$$

wherein id is said d-axis current, iq is said q-axis current, idr is said commanded d-axis current value, iqr is said commanded q-axis current value, Ld is an inductance of the d-axis of the motor, Lq is an inductance of the q-axis of the motor, R is an electric resistance of the motor, ω is an angular velocity of a rotor of the motor.

6. A driver circuit for driving a permanent-magnet electric motor, comprising:

an inverter for generating an electric current to be applied to the permanent-magnet motor, according to a commanded voltage value applied thereto;

motor-drive-current detecting means for detecting the drive current of the motor;

current detecting means for detecting a d-axis current and a q-axis current which are respectively an exciting current component and a torque current component of the detected drive current;

current-difference calculating means for calculating a d-axis current difference between the detected d-axis current and a commanded d-axis current value, and a q-axis current difference between the detected q-axis current and a commanded q-axis current value;

non-interference processing means for calculating a d-axis difference signal which is a function of a d-axis input voltage of the motor and is not a function of a q-axis input voltage of the motor, and a q-axis difference signal which is a function of the q-axis input voltage and is not a function of the d-axis input voltage; and inverter control means for controlling said inverter on the basis of the calculated d-axis and q-axis difference signals, such that the d-axis and q-axis difference signals are zeroed, wherein that said non-interference processing means generates a value xd as said d-axis difference signal, and a value xq as said q-axis difference signal, the values xd and xq being represented by the following equation:

$$\begin{pmatrix} xd \\ xq \end{pmatrix} = \begin{pmatrix} R & \omega Lq \\ -\omega Ld & R \end{pmatrix} \begin{pmatrix} idr - id \\ iqr - iq \end{pmatrix}$$

wherein id is said d-axis current,
iq is said q-axis current,
idr is said commanded d-axis current value, iqr is said commanded q-axis current value,
Ld is an inductance of the d-axis of the motor,
Lq is an inductance of the q-axis of the motor,
R is an electric resistance of the motor,
ω is an angular velocity of a rotor of the motor.

7. A method of controlling a driver circuit for driving an electric motor, comprising the steps of:
   detecting a drive current of the motor;
   detecting a d-axis current and a q-axis current which are respectively an exciting current component and a torque current component of the detected drive current;
   calculating a d-axis current difference between the detected d-axis current and a commanded d-axis current value, and a q-axis current difference between the detected q-axis current and a commanded q-axis current value;
   calculating a d-axis difference signal which is a function of a d-axis input voltage of the motor and is not a function of a q-axis input voltage of the motor and a q-axis difference signal which is a function of the q-axis input voltage and is not a function of the d-axis input voltage; and
   controlling an inverter on the basis of the calculated d-axis and q-axis difference signals, such that the d-axis and q-axis difference signals are zeroed, wherein said step of calculating a d-axis difference signal and a q-axis difference signal comprises calculating a value xd as said d-axis difference signal, and a value xq as said q-axis difference signal, according to the following equation:

$$\begin{pmatrix} xd \\ xq \end{pmatrix} = \begin{pmatrix} R - \omega dLd & -\omega Lq \\ \omega Ld & R - \omega dLq \end{pmatrix} \begin{pmatrix} jd \\ jq \end{pmatrix} + \begin{pmatrix} \omega dLd & 0 \\ 0 & \omega dLq \end{pmatrix} \begin{pmatrix} idr - id \\ iqr - iq \end{pmatrix}$$

$$\frac{d}{dt} \begin{pmatrix} jd \\ jq \end{pmatrix} = \begin{pmatrix} -\omega d & 0 \\ 0 & -\omega d \end{pmatrix} \begin{pmatrix} jd \\ jq \end{pmatrix} + \begin{pmatrix} \omega d & 0 \\ 0 & \omega d \end{pmatrix} \begin{pmatrix} idr - id \\ iqr - iq \end{pmatrix}$$

wherein id is said d-axis current,
iq is said q-axis current,
idr is said commanded d-axis current value,
iqr is said commanded q-axis current value,
vd is a d-axis voltage (actually applied to the motor),
vq is a q-axis voltage (actually applied to the motor),
Ld is an inductance of the d-axis of the motor,
Lq is an inductance of the q-axis of the motor,
R is an electric resistance of the motor,
ω is an angular velocity of a rotor of the motor,
Φ is a number of magnetic cross fluxes of the permanent magnet,
jd is a d-axis state quantity,
jq is a q-axis state quantity, and
ωd is a coefficient.

8. A method according to claim 7, wherein said step of calculating a d-axis difference signal and a q-axis difference signal comprises calculating, on the basis of the calculated d-axis and q-axis current differences, said d-axis difference signal and said q-axis difference signal in a low frequency range.

9. A method of controlling a driver circuit for driving an electric motor, comprising the steps of:
   detecting a drive current of the motor;
   detecting a d-axis current and a q-axis current which are respectively an exciting current component and a torque current component of the detected drive current;
   calculating a d-axis current difference between the detected d-axis current and a commanded d-axis current value, and a q-axis current difference between the detected q-axis current and a commanded q-axis current value;
   calculating a d-axis difference signal which is a function of a d-axis input voltage of the motor and is not a function of a q-axis input voltage of the motor and a q-axis difference signal which is a function of the q-axis input voltage and is not a function of the d-axis input voltage; and
   controlling an inverter on the basis of the calculated d-axis and q-axis difference signals, such that the d-axis and q-axis difference signals are zeroed, wherein said step of calculating a d-axis difference signal and a q-axis difference signal comprises calculating a value xd as said d-axis difference signal, and a value xq as said q-axis difference signal, according to the following equation:

$$\begin{pmatrix} xd \\ xq \end{pmatrix} = \begin{pmatrix} R & \omega Lq \\ -\omega Ld & R \end{pmatrix} \begin{pmatrix} idr - id \\ iqr - iq \end{pmatrix}$$

wherein id is said d-axis current,
iq is said q-axis current,
idr is said commanded d-axis current value,
iqr is said commanded q-axis current value,
Ld is an inductance of the d-axis of the motor,
Lq is an inductance of the q-axis of the motor,
R is an electric resistance of the motor, and
ω is an angular velocity of a rotor of the motor.

* * * * *